United States Patent
Malkawi

(10) Patent No.: US 9,961,168 B1
(45) Date of Patent: May 1, 2018

(54) DRIVERLESS WIRELESS MODULE

(71) Applicant: GLOBAL TELECOM, CORP, Irvine, CA (US)

(72) Inventor: Ahmad Issam Malkawi, Irvine, CA (US)

(73) Assignee: GLOBAL TELECOM, CORP, Irvine, CA (US)

( * ) Notice: Subject to any disclaimer, the term of this patent is extended or adjusted under 35 U.S.C. 154(b) by 0 days. days.

(21) Appl. No.: 15/847,216

(22) Filed: Dec. 19, 2017

Related U.S. Application Data

(60) Provisional application No. 62/436,848, filed on Dec. 20, 2016.

(51) Int. Cl.
| | |
|---|---|
| *G06F 15/16* | (2006.01) |
| *H04L 29/06* | (2006.01) |
| *H04B 1/3816* | (2015.01) |
| *H04B 1/00* | (2006.01) |
| *H04B 1/44* | (2006.01) |

(52) U.S. Cl.
CPC .......... *H04L 69/08* (2013.01); *H04B 1/3816* (2013.01); *H04B 1/0067* (2013.01); *H04B 1/44* (2013.01)

(58) Field of Classification Search
CPC ........................................................ H04L 69/08
USPC ........................................................ 709/250
See application file for complete search history.

(56) References Cited

U.S. PATENT DOCUMENTS

2009/0199219 A1*  8/2009  Rofougaran ............ G06F 9/441
                                                                719/330
2010/0217912 A1*  8/2010  Rofougaran ...... H04M 1/72527
                                                                710/304

* cited by examiner

*Primary Examiner* — Glenford Madamba
(74) *Attorney, Agent, or Firm* — Knobbe, Martens, Olson & Bear, LLP

(57) ABSTRACT

A module having at least a processor, memory and a wireless communication capability communicates with a host computing device that does not include a network device driver and is not able to directly access the network. The module provides wireless network access to the host computing device that does not include a network device driver. The module interfaces internally with the host computing device and utilizes a data frame communication protocol, such as an Ethernet protocol, to pass network data to the host computing device that was received from the network and to receive network data from the host computing device for transmission to the network.

20 Claims, 6 Drawing Sheets

DRIVERLESS WIRELESS MODULE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

In computing, a device driver or driver is a computer program that operates or controls a particular type of hardware device that is attached to a computer. The driver provides a software interface to the hardware device, enabling operating systems and other computer programs of the computer to access functions of the hardware device without knowing the details of the hardware device being used by the computer. The driver, however, provides access into the computer, which compromises the security of the computer.

SUMMARY

A module interfaces with the host device to provide the host device a wireless communications interface to the network where the host device does not include a network interface device driver. The module can be connected independently to the network and can pass data to the host device as Ethernet data without interfacing or interfering with the host system, CPU, memory, or other peripherals associated with the host device.

Certain embodiments relate to a method to communicate network data associated with a network with a host device that does not include a network driver, where the host device is unable to communicate with the network without the network driver. The method comprises receiving a radio frequency signal with a module, the radio frequency signal including network data for a host device that does not include a network driver, where the host device is unable to communicate with the network without the network driver; processing, with the module, the radio frequency signal to generate baseband data that includes the network data; removing from the baseband data overhead data that refers to a communication protocol associated with the network; adding, with the module, informational data to the baseband data to form host data, the informational data associated with one or more of the RF signal and the network; and sending, with the module, the host data over an interface to the host device using an Ethernet protocol, where the host data includes the network data.

According to a number of embodiments, the disclosure relates to a module to communicate network data associated with a network with a host device that does not include a network driver, where the host device is unable to communicate with the network without the network driver. The module comprises an antenna configured to receive and transmit a radio frequency signals, where the radio frequency signals include network data for a host device that does not include a network driver, and where the host device unable to communicate with the network without the network driver; signal processing circuitry configured to process a received radio frequency signal to generate baseband data that includes the network data; a processor and associated memory that stores instructions to be executed by the processor to remove from the baseband data overhead data that refers to a communication protocol associated with the network and to add informational data to the baseband data to form host data, where the informational data is associated with one or more of the RF signal and the network; and an interface configured to send the host data to the host device using an Ethernet protocol, where the host data includes the network data.

In an embodiment, a host communication protocol is added to the host data before sending the host data to the host device. In another embodiment, the host communication protocol is mobile broadband interface model (MBIM). In a further embodiment, the processor is configured to retrieve subscriber identity module (SIM) data from a SIM card associated with the host device. In a yet further embodiment, the informational data is further associated with the SIM data.

In an embodiment, the informational data includes one or more of an indication of a network communication protocol, an indication of a network carrier, and an indication of signal strength of the RF signal. In another embodiment, the interface includes a universal serial bus (USB) port. In a further embodiment, the module is tethered to the host device via a cable in communication with the USB port. In a yet further embodiment, the interface includes a connector on the module configured to mate with a corresponding connector on the host device. in an embodiment, the connector is an M.2 connector

BRIEF DESCRIPTION OF THE DRAWINGS

Embodiments of this disclosure will be described, by way of non-limiting example, with reference to the accompanying drawings.

DETAILED DESCRIPTION

Figure 1:
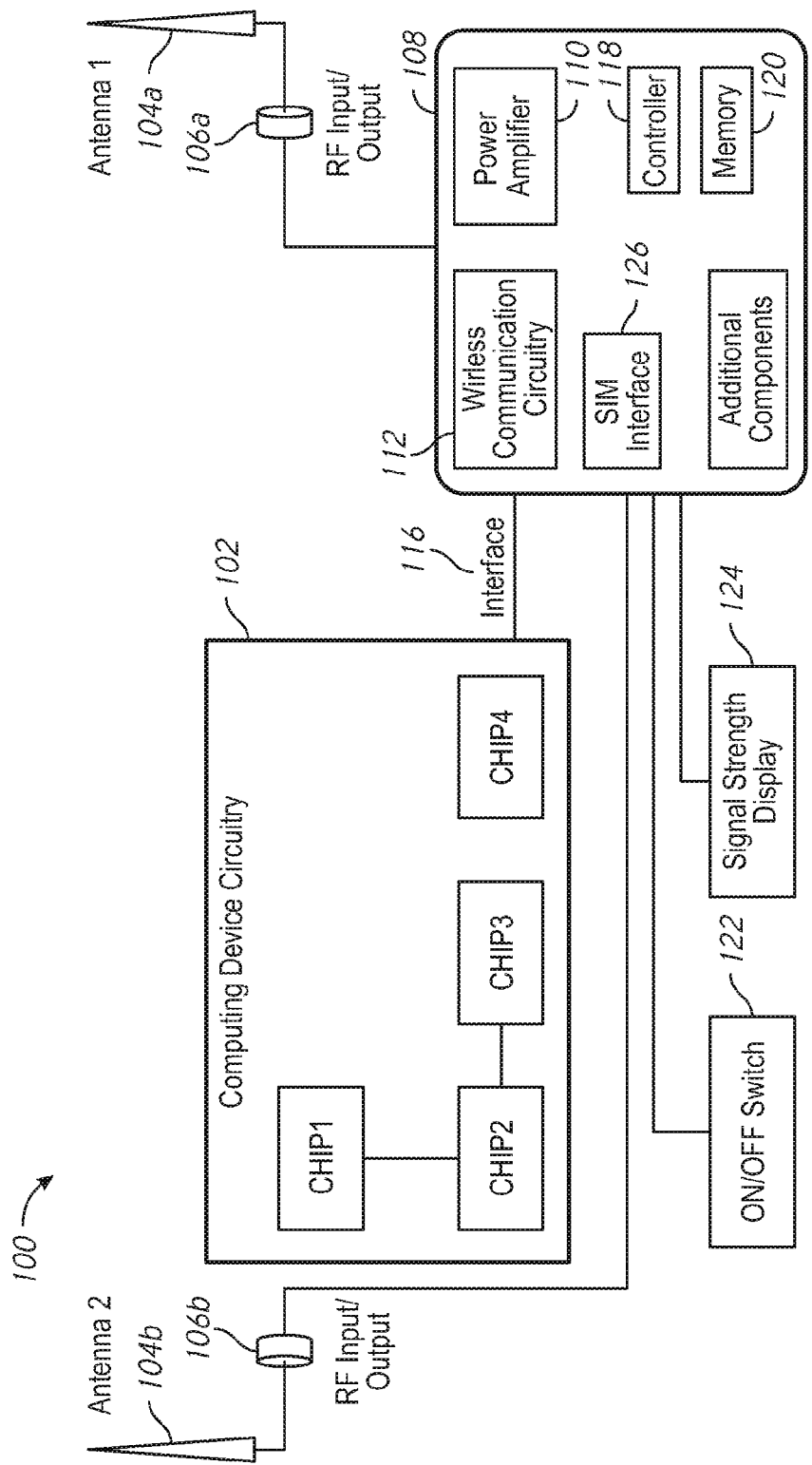
FIG. 1 is a block diagram of module interfacing with a host device to provide the host device network access, according to certain embodiments.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Embodiments of the module provide connectivity to host devices such as, but not limited to personal computers, Chromebooks®, laptops, tablets, routers, wearable computers, personal digital assistants, electronic book readers, set-top box, camera, vehicles, such as automobiles or trucks, appliances, such as thermostats, refrigerators, or washing machines, controller, digital media player, eyewear, home or car device, an Internet of things device, virtual or augmented reality computing device, automatic teller machines (ATM), power meters, gas meters, street meters, and any device that could be connected to a network but does not include a network interface device driver.

The network can be a local area network, a wide area network, a wireless local area network, a personal area network, or the Internet. In an embodiment, the module provides Long Term Evolution (LTE) and wireless broadband connectivity to the host device. In an embodiment, the module provides high-speed wireless Internet access to the host device. The module is easily adaptable to other wireless communication standards, such as 3G, 4G, 4G LTE, 5G, code division multiple access (CDMA), global system for mobile communications (GSM), or future standards. In an embodiment, the network is associated with a network service provider which provides network access to the network. Examples of network service providers are telecommunications companies, data carriers, wireless communication providers, Internet service providers, and cable television operators.

The module can connect independently to the network and can pass data to the host device as Ethernet data. In an embodiment, the module strips overhead data from the data stream and passes only Ethernet data to the host device. Because the module can connect independently to the network, the module does not need support or management from the host device. Advantageously, the module enhances security of the host device. Because the interface between the module and host device can be via Ethernet port connection, the host device is able to control the data it receives from the module. The module has firewall and security protocols provided by the network service providers via the network connectivity.

The module comprises a processor or CPU and memory that are independent of the processor and memory associated with the host device. Because the module has its own processor and memory, the host device does not manage or support the module. The host device's processor and memory sustain normal performance and, advantageously, are not burdened with management of the module.

In an embodiment, the module sustains two separate images for its firmware. The first image is the running firmware and the second image is the previous image. Firmware can be downloaded via wireless management public data network (PDN) to the module. Once the firmware is downloaded, the module can perform an update of its firmware. After new firmware is fully updated, module executes the new image. This provides minimal interruption of normal operations. Firmware can be downloaded via the module's management port allowing the module to operate and provide data to the host device while downloading. Further, the module can continue to operate for power interruptions that occur during firmware upgrades because the first image will continue to operate until the new firmware is fully confirmed and updated.

Dongle-Based Radio

FIG. 1 is a block diagram of a host device 100 including computing device circuitry 102 interfacing with an embodiment of a module. The computing device circuitry 102 comprises chips 1-4, which represent the circuitry used to provide functionality of the host device 100. Examples of chips 1-4 are, but not limited to a microprocessor, memory, serial ports, parallel ports, circuitry to support peripheral devices such as a keyboard, disk drive, mouse, and the like, circuitry to support graphics and/or video functionality, and the like, and can comprise more or less than the chips 1-4 that are illustrated. In an embodiment, a motherboard of the host device 100 comprises the computing device circuitry 102.

As illustrated in FIG. 1, the module comprises a module circuit board 108, first and second antennas 104a, 104b, first and second radio frequency (RF) input/output devices 106a, 106b, an ON/OFF switch 122, and a signal strength indicator 124.

In an embodiment, the module circuit board 108 comprises one or more power amplifiers 110, wireless communication circuitry 112, a processor 118, memory 120, an interface 116, and a subscriber identity module (SIM) interface 126.

The processor 118 is in communication with at least the memory 120 and the wireless communication circuitry 112, and comprises, by way of example, one or more processors, program logic, or other substrate configurations representing data and instructions, which operate as described herein. In other embodiments, the processors can comprise controller circuitry, processor circuitry, processors, general purpose single-chip or multi-chip microprocessors, digital signal processors, embedded microprocessors, microcontrollers and the like.

The memory 120 comprises, by way of example, RAM, SRAM, DRAM, ROM, flash memory, and the like and is configured to store instructions, that when executed by the processor 118, cause the module to operate. The memory 120 can further store network configurations that are related to network service providers.

Wireless communication circuitry 112 comprises one or more integrated circuits configured to support wireless communications. In an embodiment, wireless communication circuitry 112 comprises one or more integrated circuits configured to support wireless broadband communications. For example, the wireless communications circuitry 112 comprises system-on-chip integrated circuit(s) that integrate radio frequency, baseband modem, and digital signal processing functions. In an embodiment, the wireless communication circuitry 112 supports LTE wireless communications functionality and comprises, for example, the chipset GDM7243S and GMD7242Q from GCT Semiconductor, Inc. In an embodiment, other chipsets may be used that support other wireless communication technologies. Other wireless communications chipset companies include, but are not limited to Qualcomm Inc., Sequans Communications, Intel Corporation, and the like. Other wireless communication technologies include, but are not limited to 3G, 4G, 5G, High Speed Packet Access (HSPA), and the like, and support one or more of Global System for Mobiles (GSM), Code Division Multiple Access (CDMA), and the like.

The wireless communication circuitry 112 is in communication with the processor 118 and the one or more power amplifiers 110. The wireless communication circuitry 112 is further in communication with the computing device circuitry 102 of the host device 100 via the interface 116.

The interface 116 is configured to pass the network data as digital data using an Ethernet protocol between the host device's computing device circuitry 102 and the module circuitry on the module circuit board 108. Ethernet is a computer networking protocol. For example, systems communicating over Ethernet divide a stream of data into shorter pieces called frames. Each frame contains source and destination addresses, and error-checking data so that damaged frames can be detected and discarded. In an embodiment, the module passes Ethernet only data to/from the host device 100.

In the embodiment illustrated in FIG. 1, the interface 116 can be a Universal Serial Bus (USB) interface, and the interface 116 comprises a USB port located on the module circuit board 108 that interfaces with a USB port of the computing device circuitry 102. The interface 116 further comprises a cable that connects the two USB ports. The cable can be a coaxial cable, a twisted pair of wires, a fiber optic cable, or the like. In an embodiment, the module circuit board 108 and the cable comprise a dongle configured to provide network connectivity to the host device 100.

The one or more power amplifiers 110 are configured to amplify an RF signal for transmission by the first and second antennas 104a, 104b.

The SIM interface 126 is configured to interface with the SIM card that is inserted in the SIM card holder of the host device 100. A SIM card stores data, such as, but not limited to user identity, location and phone number, network authorization data, personal security keys, contact lists, stored text messages, and the like. The SIM card may provide security features such as authentication and encryption to protect data and prevent eavesdropping. The SIM interface 126 is configured to receive the SIM card data from the SIM card and transmit the SIM card data to one or more of the processor 118, the memory 120, and the wireless communication circuitry 112. In an embodiment, the SIM card interface 126 is configured to interface with 2FF type (mini-size) SIM cards. In an embodiment, the SIM card interface 126 is configured to interface with 1FF type (full-size), 3FF type (micro-size), or 4FF (nano-size) SIM cards. In an embodiment, the SIM card interface 126 is configured to interface with an electronic SIM card (eSIM), a virtual SIM card, or the like. In an embodiment, data associated with the eSIM or virtual SIM card is stored in the module's memory 120.

The module circuitry 108 further comprises additional components that may be used to support current or future module functionality. For example, the additional circuitry can be used to support future versions or enhancements to the wireless communication circuitry 112, such as, but not limited to category 6, category 7, category 9, category 12, category 16, category 18, category $4^{th}$ generation wireless, and category $5^{th}$ generation wireless.

The first and second antennas 104a, 104b are configured to receive an RF signal and transmit an RF signal. In an embodiment, the first and second antennas 104a, 104b support multiple bands and frequencies ranging from approximately 400 MHz to approximately 6,000 MHz. In an embodiment, the first and second antennas 104a, 104b support multiple bands and frequencies ranging from approximately 400 MHz to approximately 2,800 MHz. In an embodiment, one or two antennas are used to transmit and receive RF signals. Module supports multiple input multiple output (MIMO) configurations. In this configuration, multiple antennas can be used to support up to 64×64 MIMO configurations. In an embodiment, more than two antennas are used to transmit and receive RF signals. In an embodiment, the first and second antennas 104a, 104b are embedded in the host device 100, which is further illustrated in FIG. 3. The first and second antennas 104a, 104b are in communication with the first and second RF input/output devices 106a, 106b, respectively.

The first and second RF input/output devices 106a, 106b are configured to transmit RF signals to the first and second antennas 104a, 104b when in the transmit mode and receive RF signals from the first and second antennas 104a, 104b when in the receive mode. The first and second RF input/output devices 106a, 106b are in communication with the first and second antennas 104a, 104b, respectively and in communication with the module circuitry on the module circuit board 108, such as the one or more power amplifiers 110 and the wireless communication circuitry 112.

In an embodiment, the first and second antennas 104a, 104b, the first and second RF input/output devices 106a, 106b, and the module circuitry on the module circuit board 108 comprise a radio. In an embodiment, the radio is configured to receive and/or transmit RF signals at approximately 700 MHz, 850 MHz, 900 MHz, 1500 MHz, 1700 MHz, 1900 MHz, 2100 MHz, 2200 MHz, 2300 MHz, 2400 MHz, 2500 MHz, 3500 MHz and/or 3650 MHz. In an embodiment, the radio is configured to receive and/or transmit RF signals at approximately 5 GHz. In an embodiment, the radio is configured to support multiple bands and frequencies ranging from approximately 400 MHz to approximately 6,000 MHz.

The ON/OFF switch 122 is configured to switch power ON or OFF to the module, which in turn turns the wireless connectivity for the host device 102 ON and OFF. In an embodiment, the module receives power from the host device 100. In an embodiment, the module further comprises a power supply and supplies power to the module circuitry independent of the power to the host device 100. In an embodiment, the ON/OFF switch 122 is a dedicated switch for the module and is independent of the host device 100. In another embodiment, the ON/OFF switch 100 is configured to switch power ON and OFF concurrently to the module and the host device 100. In an embodiment, the ON/OFF switch 122 is a redundant switch as the module can be powered ON/OFF by the host device 100.

The signal strength indicator 124 is configured to provide an indication of the strength of the wireless signal being received by the first and second antennas 104a, 104b from the network service provider. Examples of displays of signal strength can include a series of bars of increasing height, a series of LEDs, a series of bands, or the like that indicate varying amounts of signal strength. In an embodiment, the indication of signal strength is audio.

Embedded Module

Figure 2:
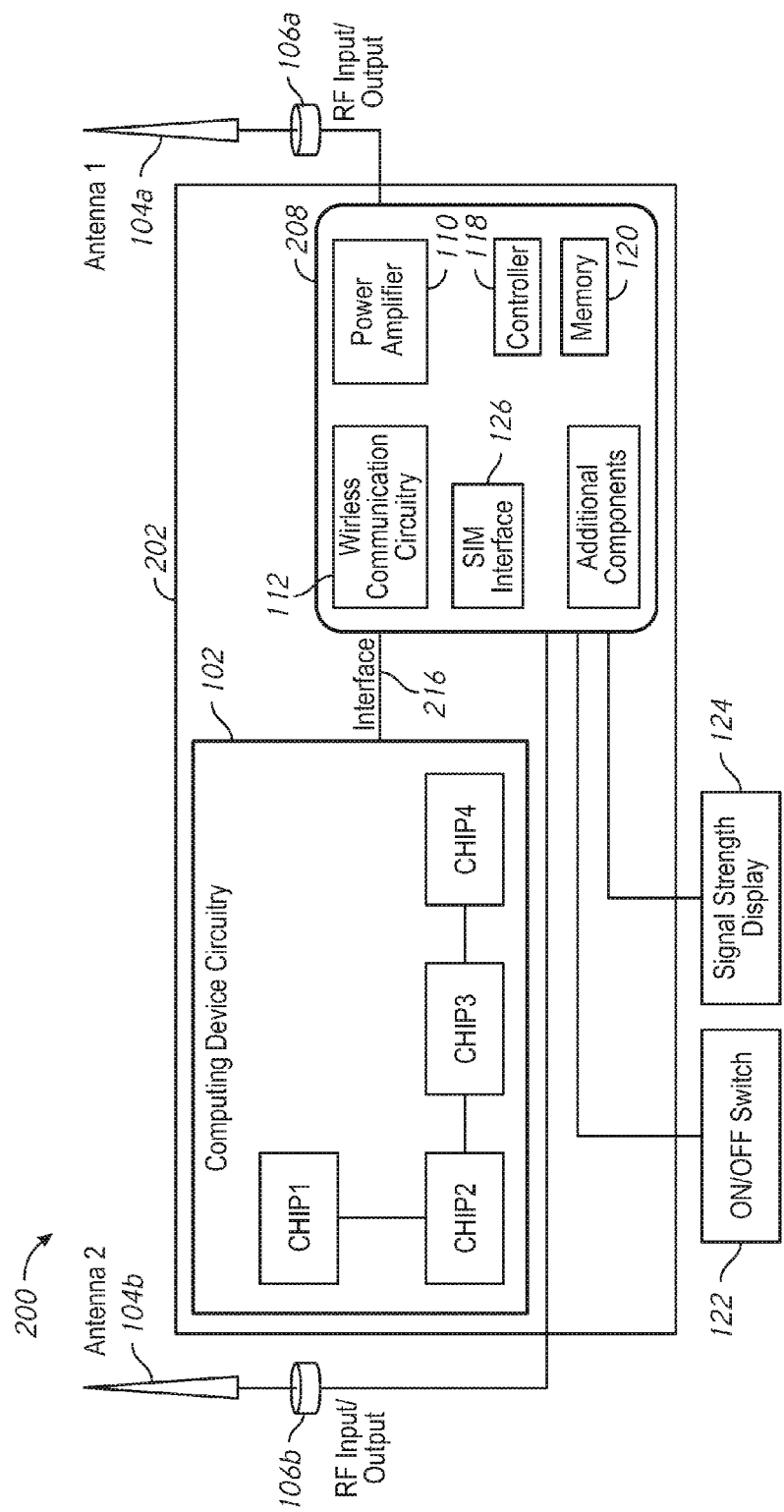
FIG. 2 is a block diagram of module interfacing with a host device to provide the host device network access, according to certain embodiments.

FIG. 2 is a block diagram of a host device 200 including computing device circuitry 102 interfacing with an embodiment of a module. As illustrated in FIG. 2, the module comprises a module circuit board 208, the first and second antennas 104a, 104b, the first and second radio frequency (RF) input/output devices 106a, 106b, the ON/OFF switch 122, and the signal strength indicator 124. In an embodiment, the module circuit board 208 comprises the one or more power amplifiers 110, the wireless communication circuitry 112, the processor 118, the memory 120, an interface 216, and the subscriber identity module (SIM) interface 126.

The computing device circuitry 102, the first and second antennas 104a, 104b, the first and second RF input/output devices 106a, 106b, the ON/OFF switch 122, the signal strength indicator 124, the one or more power amplifiers 110, the wireless communication circuitry 112, the processor 118, the memory 120, and the subscriber identity module (SIM) interface 126 have been described above with respect to FIG. 1.

In the embodiment illustrated in FIG. 2, the module is embedded in the host device 200 such that the motherboard of the host device 200 comprises the computing device circuitry 102 and the module circuit board 208. The module circuit board 208 further comprises the interface 216.

The interface 216 is configured to pass the network data as digital data using an Ethernet protocol between the host device's computing device circuitry 102 and the module circuitry on the module circuit board 208.

In the embodiment illustrated in FIG. 2, the interface 216 is an M.2 interface, and the interface 216 comprises an M.2 connector located on the module circuit board 208 that interfaces with a mating M.2 connector of the computing device circuitry 102. In an embodiment, the interface 216 can utilize other mating connector pairs, such as, but not limited to peripheral component interconnect express (PCIe), land grid array (LGA), secure digital input/output (SDIO), universal asynchronous receiver/transmitter (UART), inter-IC sound (I2S), serial peripheral interface bus (SPI), inter-integrated circuit (I2C), joint test action group (JTAG), and the like. In an embodiment, the interface 216 between the module circuit board 208 and the computing device circuitry 102 of the host device 200 is hard-wired on the motherboard of the host device 200. In an embodiment, the components of the module circuit board 208 (the wireless communication circuitry 112, the one or more power amplifiers 110, the processor 118, the memory 120, and the like) are mounted directly onto the motherboard of the host device 200.

In an embodiment, the placement of the module circuit boards 108, 208 within the host device 102 is optimized to permit utilization of the Multiple Input Multiple Output (MIMO) feature, which is found in wireless communication protocols to exploit multipath propagation by using multiple transmit and receive antennas.

Figure 3:
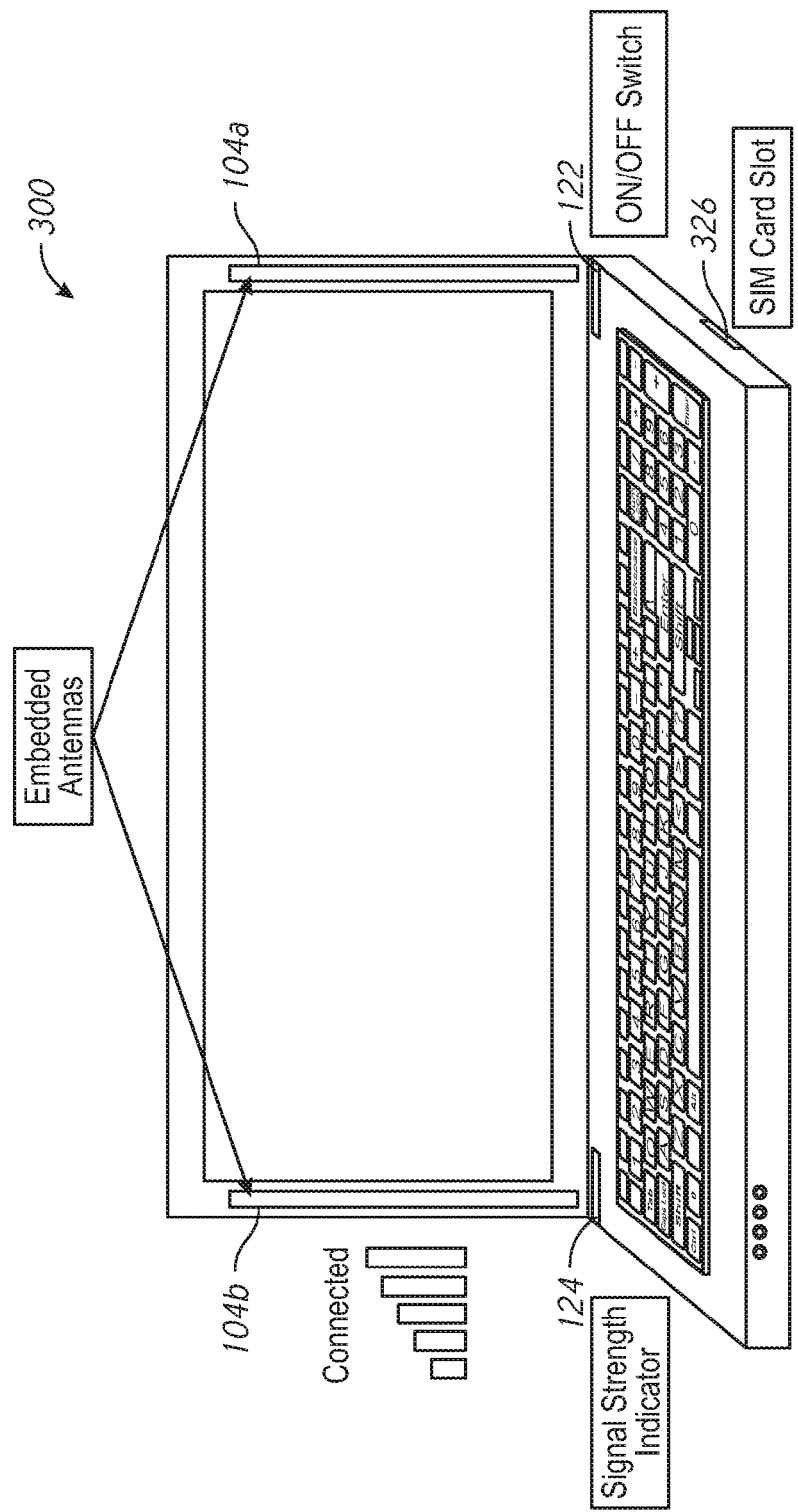
FIG. 3 illustrates a host computing device including a module to provide the host computing device wireless network access, according to certain embodiments.

FIG. 3 illustrates a host computing device 300 including an embodiment of a module. The module provides network connectivity to the host computing device 300, which does not include a network interface device driver. The module circuit board 108, 208 is located within the host device 300 and not illustrated in FIG. 3. Antennas 104a, 104b are embedded into the sides of a rotating top portion of the host device 300. In other embodiments, the antennas 104a, 104b are located in other portions of the host computing device 300. Non-limiting examples of the signal strength indicator 124 and the module ON/OFF switch 122 are shown on a bottom portion of the host device 300, in an area that surrounds a keyboard portion of the host device 300. SIM card slot 326 is configured to receive a SIM card, which interfaces with the module through the SIM card interface 126 (not illustrated).

Figure 4:
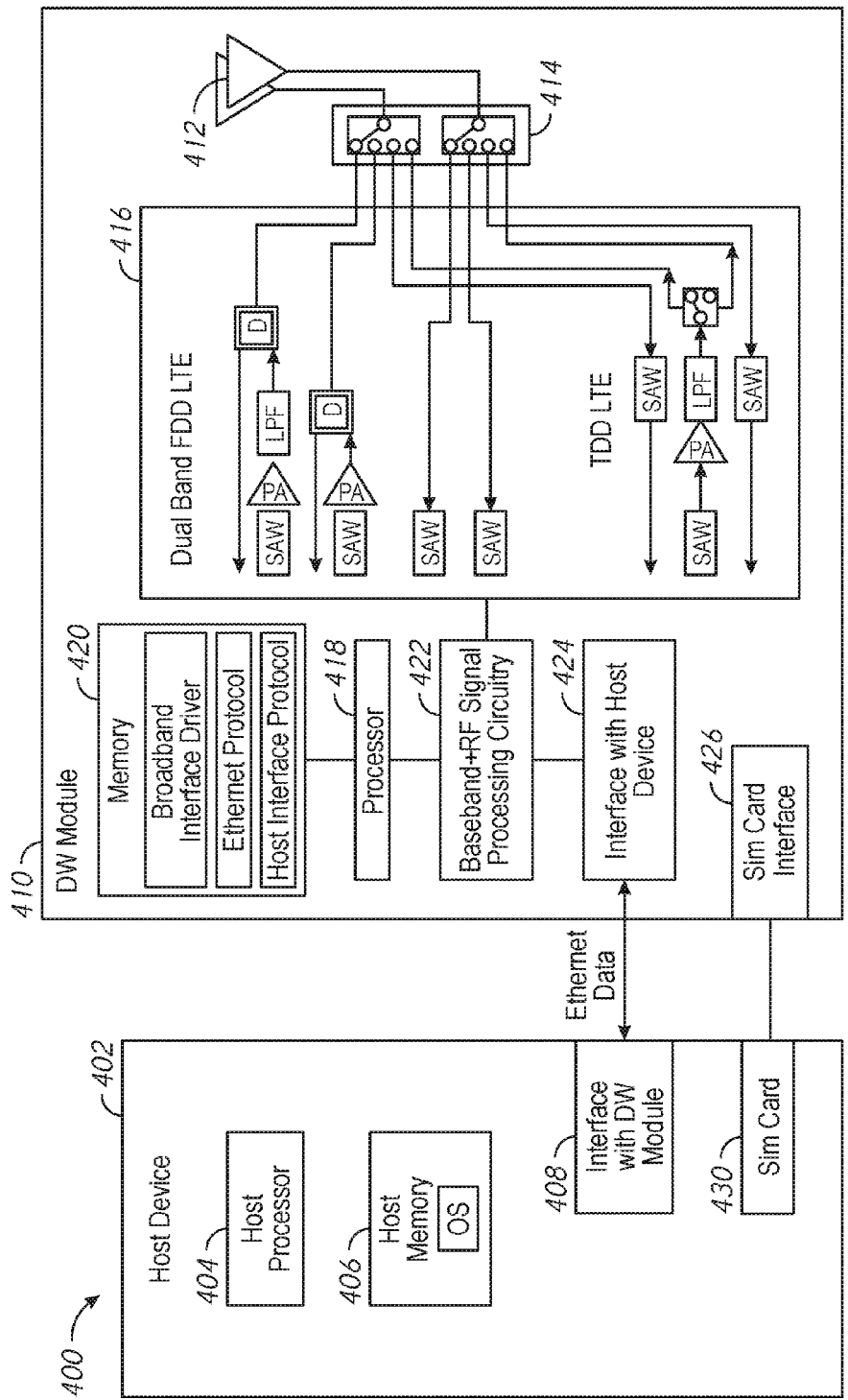
FIG. 4 is a block diagram of a driverless wireless module and a host device, according to certain embodiments.

FIG. 4 is a block diagram 400 of a driverless wireless module 410 and a host device 402. The host device 402 comprises a host processor 404 and host memory 406 that stores at least an operating system that supports the host device's functions, such as, but not limited to scheduling tasks, executing applications, and controlling peripherals. The host device 402 does not include software or hardware device drivers to support connectivity to a network. In an embodiment, the network is the Internet.

Because the host device 402 does not comprise the network device drivers, unauthorized access to the host device through network device drivers, from hackers, for example, cannot occur. Not including network device drivers in the host device 402 provides additional security for the host device 402. Often unauthorized access to the host device 402 provides unauthorized access to computers with which the host device is in communication. For example, a compromised or hacked host device 402 in communication with a server associated with a school in a school district may provide unauthorized access to the contents of the server.

To provide network access, such as Internet access, the host device 402 communicates with the module 410 using an Ethernet protocol to receive network data via the module 410 and to send host data via the module 410 to the network. The host device 402 further comprises an interface 408 that is configured to communicate data to the module 410.

The host device 402 further comprises a subscriber information module (SIM) card 430 that stores data, such as, but not limited to user identity, location and phone number, network authorization data, personal security keys, contact lists, stored text messages, and the like, as described above.

Module 410 is referred to as a driverless wireless module (DWM) because it permits the host device 402 to wirelessly access the network without a network device driver installed in the host device 402. A driverless wireless system (DWS) comprises the host device 402 and the module 410.

In an embodiment, the module 410 is located within the host device 402. The interface 408 of the host device 402 can be located on the motherboard of the host device 402. In an embodiment, the module 410 is tethered with a cable or set of wires to the interface 408 on the motherboard of the host device 402. In an embodiment, the module 410 is electrically connected to the motherboard through a pair of mating connectors, where one of the connector is located on the module 410 and the mating connector is located on the motherboard of the host device 402. While the module 410 is described as being in communication with the motherboard on the host device 402, other circuit boards, components, and circuitry of the host device 402 can be in communication with the module 410 to provide driverless wireless connectivity for the host device 402. The module 410 operates independently of the operating system installed in the host device 402.

Module 410 comprises a processor 418 memory 420 that includes instructions to be executed by the processor 418. In an embodiment, the memory 420 includes the network or broadband interface driver, Ethernet protocol, and a host interface protocol. The network device driver can be used by the module 410 to access the network. The Ethernet protocol can be used by the module 410 when communicating data between the host device 402 and the module 410. The host communication protocol can be used by the module 410 when communicating with the host device 402 and adds an additional layer to the communications between the module 410 and the host device 402. Examples of a host communication protocol are mobile broadband interface model (MBIM), remote network drive interface specification (RNDIS), and the like.

Module 410 further comprises a SIM card interface 426 configured to read SIM data from the SIM card 430.

The module 410 further comprises one or more antennas 422, one or more radio frequency input/output switches 414, amplifier, filter, and switch circuitry 416, and baseband and radio frequency signal processing circuitry 422. In an embodiment the one or more antennas 422, the one or more radio frequency input/output switches 414, the amplifier, filter, and switch circuitry 416, and the baseband and radio frequency signal processing circuitry 422 comprise a radio that is configured to receive and transmit radio frequency signals.

The baseband and radio frequency signal processing circuitry 422 in communication with the processor 418 and the amplifier, filter, and switch circuitry 416, which is in communication with one or more radio frequency input/ output switches 414. The one or more radio frequency input/output switches 414 are also in communication with the corresponding one or more antennas 412.

The baseband and radio frequency signal processing circuitry 422 process baseband data to provide radio frequency signals for transmission and process the received radio frequency signals to provide baseband data. The amplifier, filter, and switch circuitry 416 receives the radio frequency signals from the baseband and radio frequency signal processing circuitry 422 and amplifies and filters the radio frequency signal for transmission. The amplifier, filter, and switch circuitry 416 further receives radio frequency signals from the radio frequency input/output switches and amplifies and filters the received radio frequency signals before passing the radio frequency signals to the baseband and radio frequency signal processing circuitry for conversion to baseband data.

In an embodiment, the amplifier, filter, and switch circuitry 416 supports multiband. In the embodiment, the amplifier, filter, and switch circuitry 416 is configured to support dual band frequency division duplex (FDD) signaling and to support time division duplex (TDD) signaling. In the embodiment illustrated in FIG. 4, the amplifier, filter, and switch circuitry 416 is configured to support dual band FDD long term evolution (LTE) signaling and to support TDD LTE signaling. In an embodiment, the amplifier, filter, and switch circuitry 416 can be configured to support other frequency bands and other wireless communication standards, such as 3G, 4G, 4G LTE, 5G, and other standards associated with code division multiple access (CDMA) and global system of mobiles (GSM) technologies. The filters can be implemented in hardware or in software.

The radio frequency input/output switches 414 receive radio frequency signals from the amplifier, filter, and switch circuitry 416 and pass the radio frequency signals to the antennas 412 for transmission when they are in the transmit mode. When the radio frequency input/output switches 414 are in the receive mode, they receive the radio frequency signals from the antennas 412 and pass the received radio frequency signals to the amplifier, filter, and switch circuitry 416.

The module 410 further comprises an interface 424 that is in communication with the baseband and radio frequency processing circuitry 422 to communicate network data to the host device 402 and to receive data from the host to be sent to the network. In an embodiment, the interfaces 408 and 424 are configured as universal serial bus (USB) ports. As described above with respect to the host device 402, the module 410 can be tethered with a cable or set of wires to the interface 408 on the host device 402 or can be electrically connected to the motherboard through a pair of mating connectors, where one of the connector is located on the module 410 and the mating connector is located in the host device 402. In an embodiment, the connectors associated with the interfaces 408, 424 are M.2 connectors.

Figure 5A:
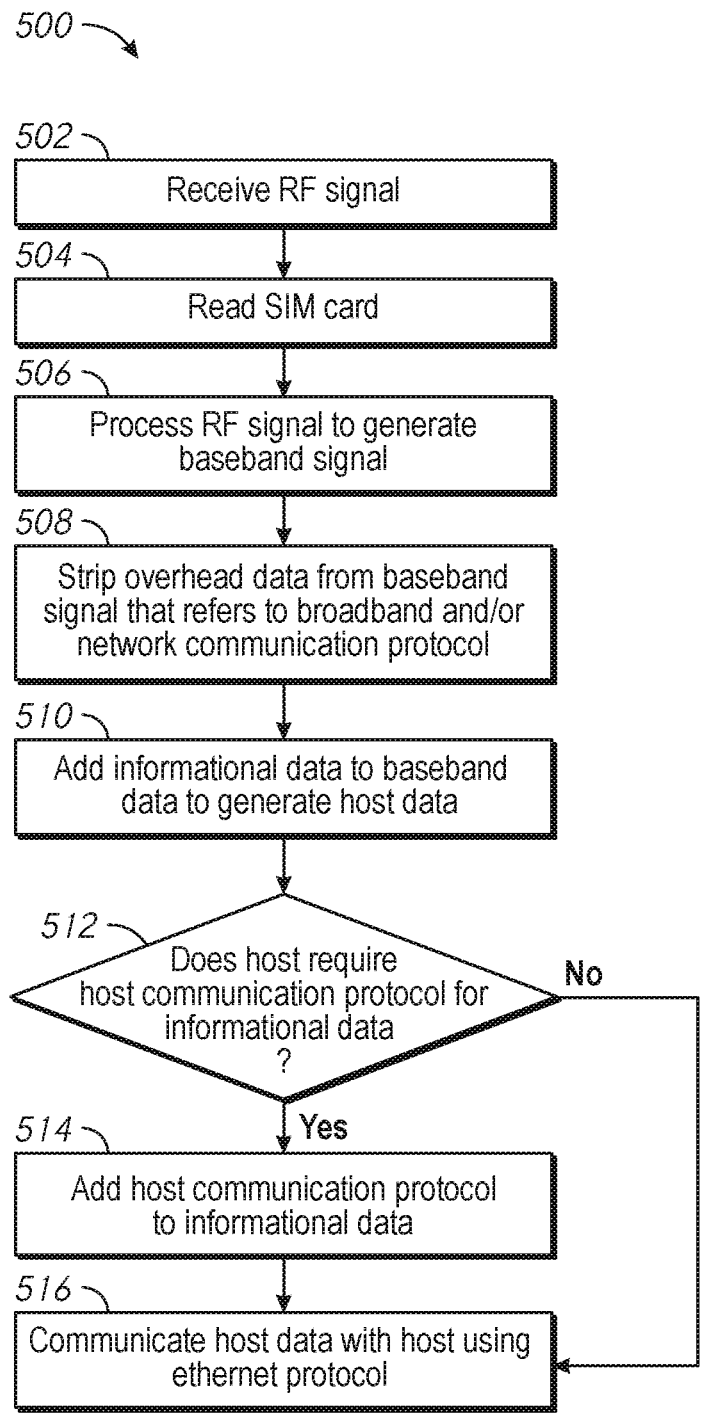
FIGS. 5*a* and 5*b* are flowcharts illustrating communication processes between the network and a computing device via the driverless wireless module, according to certain embodiments.

FIG. 5a Illustrates a receive process 500. At step 502, the antennas 414 and the radio frequency input/output switches 414 receive a radio frequency signal. In an embodiment, the processor 418 controls the state of the radio frequency input/output switches.

At step 504, the module 410 reads the SIM card in the host device 402 to obtain SIM data such as but not limited to network-specific information used to authenticate and identify subscribers on the network, user identity, user location, network authorization data, personal security keys. In the event that the SIM data is missing or invalid, the process 500 ends.

Once valid SIM data is verified, the process 500 moves to step 506. At step 506, the amplifier, filter and switch circuitry 416 and the baseband and radio frequency processing circuitry 422 process the radio frequency signal to generate baseband data.

At step 508, the module 410 strips overhead data from the baseband signal that is associated with broadband and/or network communication protocols of the network.

At step 510, the module 410 adds informational data to the baseband data to generate host data. In an embodiment, the information data is based at least in part on one or more of characteristics of the radio frequency signal and the SIM data. Examples of informational data include, but are not limited to a network communication protocol, an indication of a network carrier, and an indication of signal strength of the RF signal.

At step 512, the module 410 determines whether the host device 402 indicates that a host communication protocol be used to communicate the informational data to the host device 402. The module can produce information according to the MBIM communication protocol, RNDIS communication protocol or both, and send this information using the Ethernet port used to communicate with the host device 402. For host devices 402 that support MBIM and/or RNDIS, the host device 402 can read this information through the open Ethernet port. The host device 402 can internally display and use this information based on the host device's program and needs. In an embodiment, there is no handshake process between host device 402 and module 410 for MBIM or RNDIS. In another embodiment, the module 410 can utilize other information protocols to communicate information to the host device 402, as specified by the host device 402.

If the host device 402 does not indicate a host communication protocol, then the process 500 moves to step 516. If the host device 402 indicates that a host communication protocol is used by the host device 402, then the process moves to step 514.

At step 514, the module 410 adds the host communication protocol to the host data. In an embodiment, the host communication protocol adds a layer to the host data. Examples of host communication protocols are mobile broadband interface model (MBIM), Remote Network Driver Interface Specification (RNDIS), and the like. For example, MBIM is a protocol for host and device connectivity for any device with USB support, including desktops, laptops, tablets, and mobile devices. The MBIM specification supports multiple generations of GSM and CDMA-based 3G, 4G, and 5G packet data services, including LTE. MBIM can standardize the transport of data by supporting multiple IP connections per single USB interface. For another example, RNDIS is a protocol that can be used on top of USB and can provide provides a virtual Ethernet link to some operating systems.

At step 516, the module 410 communicates the host data from the interface 426 on the module 410 to the interface 408 on the host device 402 using an Ethernet protocol. The host data includes the network data, which is received by the host device 402 even though the host device 402 does not include a network device driver.

Figure 5B:
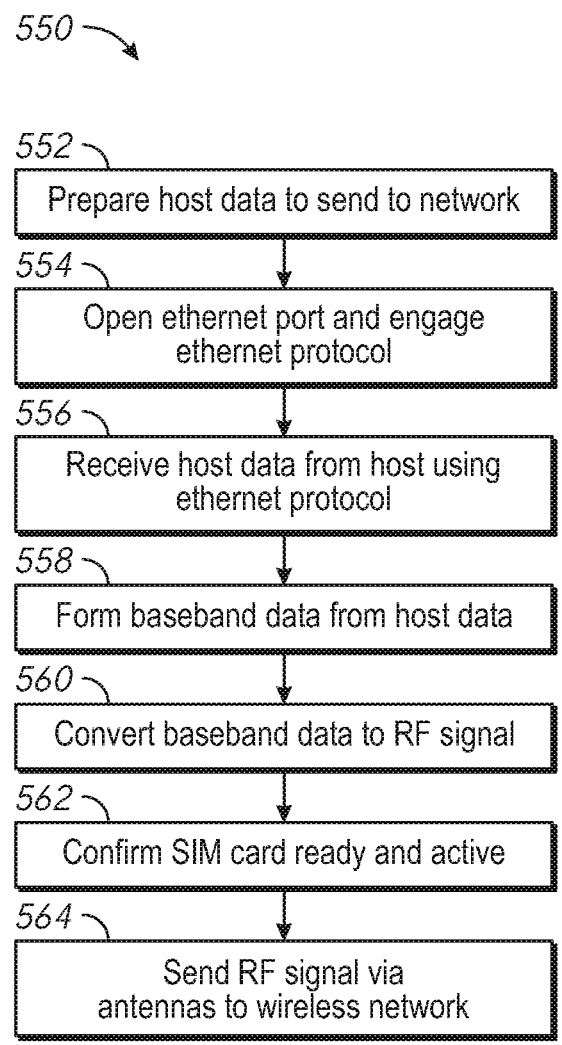

FIG. 5b illustrates a transmit process 550. At step 552, the host device 402 prepares host data including network data to send to the module 410 for transmission by the antennas 412 to the network.

At step 554, the processor 550 opens the Ethernet port and engages the Ethernet protocol. In an embodiment, the host device 402 opens the Ethernet port and engages the Ethernet protocol. In another embodiment, the module 410 opens the Ethernet port and engages the Ethernet protocol.

At step 556, the module 410 receives the host data from the host device 402 via the interface 424. At step 558, the baseband and radio frequency processing circuitry 422 forms the baseband data the host data and at step 560, the baseband and radio frequency processing circuitry 422 and the amplifier, filter, and switch circuitry convert the baseband data to an RF signal for transmission.

At step 562, the module 410 confirms the SIM card 430 is ready and active. In an embodiment, the SIM card interface 424 reads the SIM card 430. If the SIM card is not ready and active, the process 550 ends. If the SIM card is ready and active, the process 550 moves to step 564.

At step 564, the antennas 412 transmit the RF signal to the network. The RF signal includes the network data, which is generated by the host device 402 for communication to the network even though the host device 402 does not include a network device driver.

Terminology

Some of the embodiments described above have provided examples in connection with computers. However, the principles and advantages of the embodiments can be used for any other systems or apparatus that have needs for power amplifier systems.

Such a system or apparatus can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a telephone, a television, a computer monitor, a computer, a hand-held computer, a laptop computer, a tablet computer, a personal digital assistant (PDA), a PC card, a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods, apparatus, and systems described herein may be embodied in a variety of other forms; furthermore, various omissions, substitutions, and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method to communicate network data associated with a network with a host device that does not include a network driver, the host device unable to communicate with the network without the network driver, the method comprising:

receiving a radio frequency signal with a module, the radio frequency signal including network data for a host device that does not include a network driver, the host device unable to communicate with the network without the network driver;

processing, with the module, the radio frequency signal to generate baseband data that includes the network data;

removing from the baseband data overhead data that refers to a communication protocol associated with the network;

adding, with the module, informational data to the baseband data to form host data, the informational data associated with one or more of the RF signal and the network; and sending, with the module, the host data over an interface to the host device using an Ethernet protocol, the host data including the network data.

2. The method of claim 1 further comprising adding, with the module, a host communication protocol to the host data before sending the host data to the host device.

3. The method of claim 2 wherein the host communication protocol is mobile broadband interface model (MBIM).

4. The method of claim 1 further comprising retrieving, with the module, subscriber identity module (SIM) data from a SIM card associated with the host device.

5. The method of claim 4 wherein the informational data is further associated with the SIM data.

6. The method of claim 1 wherein the informational data includes one or more of an indication of a network communication protocol, an indication of a network carrier, and an indication of signal strength of the RF signal.

7. The method of claim 1 wherein the interface includes a universal serial bus (USB) port.

8. The method of claim 7 wherein the module is tethered to the host device via a cable in communication with the USB port.

9. The method of claim 1 wherein the interface includes a connector on the module configured to mate with a corresponding connector on the host device.

10. The method of claim 9 wherein the connector is an M.2 connector.

11. A module to communicate network data associated with a network with a host device that does not include a network driver, the host device unable to communicate with the network without the network driver, the module comprising:

an antenna configured to receive and transmit a radio frequency signals, the radio frequency signals including network data for a host device that does not include a network driver, the host device unable to communicate with the network without the network driver;

signal processing circuitry configured to process a received radio frequency signal to generate baseband data that includes the network data;

a processor and associated memory that stores instructions to be executed by the processor to remove from the baseband data overhead data that refers to a communication protocol associated with the network and to add informational data to the baseband data to form host data, the informational data associated with one or more of the RF signal and the network; and an interface configured to send the host data to the host device using an Ethernet protocol, the host data including the network data.

12. The module of claim 11 wherein a host communication protocol is added to the host data before sending the host data to the host device.

13. The module of claim 12 wherein the host communication protocol is mobile broadband interface model (MBIM).

14. The module of claim 11 wherein the processor is configured to retrieve subscriber identity module (SIM) data from a SIM card associated with the host device.

15. The module of claim 14 wherein the informational data is further associated with the SIM data.

16. The module of claim 11 wherein the informational data includes one or more of an indication of a network communication protocol, an indication of a network carrier, and an indication of signal strength of the RF signal.

17. The module of claim 11 wherein the interface includes a universal serial bus (USB) port.

18. The module of claim 17 wherein the module is tethered to the host device via a cable in communication with the USB port.

19. The module of claim 11 wherein the interface includes a connector on the module configured to mate with a corresponding connector on the host device.

20. The module of claim 19 wherein the connector is an M.2 connector.

* * * * *